United States Patent
Safford et al.

(10) Patent No.: US 7,725,899 B2
(45) Date of Patent: *May 25, 2010

(54) METHOD AND APPARATUS FOR COMMUNICATING INFORMATION BETWEEN LOCK STEPPED PROCESSORS

(75) Inventors: Kevin David Safford, Fort Collins, CO (US); Jeremy P. Petsinger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 787 days.

This patent is subject to a terminal disclaimer.

(21) Appl. No.: 11/598,781

(22) Filed: Nov. 14, 2006

(65) Prior Publication Data

US 2007/0061812 A1 Mar. 15, 2007

Related U.S. Application Data

(63) Continuation of application No. 10/183,563, filed on Jun. 28, 2002, now Pat. No. 7,155,721.

(51) Int. Cl.
*G06F 9/46* (2006.01)
*G06F 15/00* (2006.01)
*G06F 11/00* (2006.01)

(52) U.S. Cl. .................. 718/104; 712/225; 712/228; 712/229; 714/11

(58) Field of Classification Search .............. 718/104; 711/150; 710/14; 714/9–11; 712/225, 228, 712/229

See application file for complete search history.

(56) References Cited

U.S. PATENT DOCUMENTS 4,750,177 A * 6/1988 Hendrie et al. ............. 714/748

5,913,059 A * 6/1999 Torii ........................ 718/104
5,991,900 A * 11/1999 Garnett ...................... 714/56
6,141,718 A   10/2000 Garnett et al.
6,148,348 A * 11/2000 Garnett et al. .............. 710/14
6,263,452 B1 * 7/2001 Jewett et al. ................ 714/9
6,378,021 B1 * 4/2002 Okazawa et al. .......... 710/317

(Continued)

FOREIGN PATENT DOCUMENTS

EP    0372578    6/1990

(Continued)

OTHER PUBLICATIONS

Search Report issued on Sep. 10, 2004 in counterpart foreign application in FR under application No. 0307662

*Primary Examiner*—Meng-Ai An
*Assistant Examiner*—Jennifer N To

(57) ABSTRACT

An apparatus for communicating between lock step is incorporated on two or more processors operating in a lock step mode. Each of the processors includes processor logic to execute a code sequence, and an identical code sequence is executed by the processor logic. The apparatus further includes a processor-specific resource referenced by the code sequence. A multiplexer is coupled to the processor-specific resource, and is controlled to read data based on the identification. Coupled to the processors is a lock step logic block operable to read and compare the output of each of the processors. The lock step logic determines if operation of the processors is in a lock step mode or in an independent processor mode. Such determination may be made by the lock step logic turning off, for example.

17 Claims, 4 Drawing Sheets

U.S. PATENT DOCUMENTS

| | | | |
|---|---|---|---|
| 6,393,582 B1 * | 5/2002 | Klecka et al. | 714/11 |
| 6,604,177 B1 * | 8/2003 | Kondo et al. | 711/150 |
| 6,615,366 B1 * | 9/2003 | Grochowski et al. | 714/10 |
| 6,625,749 B1 * | 9/2003 | Quach | 714/10 |
| 6,625,756 B1 * | 9/2003 | Grochowski et al. | 714/17 |
| 6,640,313 B1 * | 10/2003 | Quach | 714/10 |
| 6,772,368 B2 * | 8/2004 | Dhong et al. | 714/11 |

FOREIGN PATENT DOCUMENTS

| GB | 2366012 | 2/2002 |
|---|---|---|

* cited by examiner

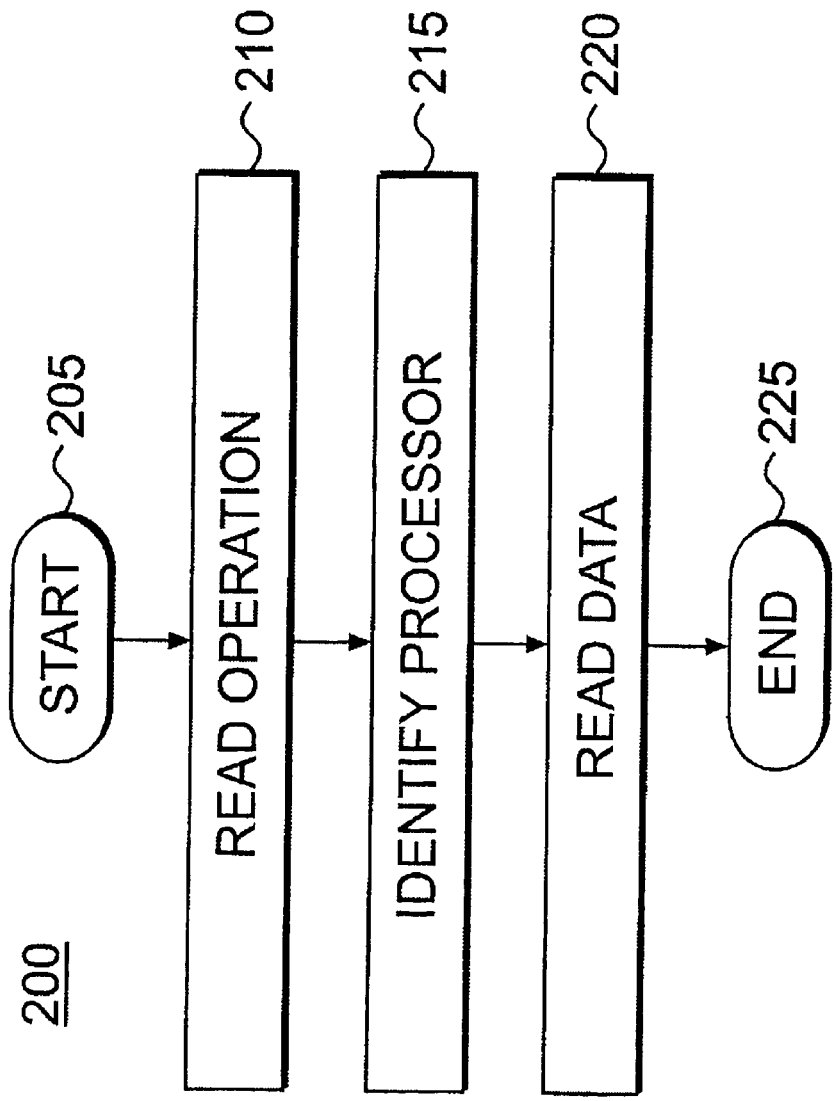

METHOD AND APPARATUS FOR COMMUNICATING INFORMATION BETWEEN LOCK STEPPED PROCESSORS

CROSS REFERENCE TO RELATED APPLICATION(S)

This is a Continuation of application Ser. No. 10/183,563, filed Jun. 28, 2002, entitled "METHOD AND APPARATUS FOR COMMUNICATING INFORMATION BETWEEN LOCK STEPPED PROCESSORS", now U.S. Pat. No. 7,155,721, which is hereby incorporated by reference in its entirety.

TECHNICAL FIELD

The technical field is mechanisms and methods for communications between processors in a multi-processor computer system.

BACKGROUND

Advanced computer architectures may employ multiple processors. Some advanced computer architectures may employ multiple microprocessors on one silicon chip. In a typical application, two microprocessors may be implemented on a single silicon chip, and the implementation may be referred to as a dual core processor. Two or more of the multiple microprocessors may operate in a lock step mode, meaning that each of the lock stepped microprocessors process the same code sequences, and should, therefore, produce identical outputs.

FIG. 1 is a diagram of a prior art dual core processor that uses lock step techniques to improve overall reliability. In FIG. 1, a computer system 18 includes a dual core processor 20 having a single silicon chip 21, on which are implemented microprocessor core 22 and microprocessor core 24. To employ lock step, each of the microprocessor cores 22 and 24 process the same code streams. The cores 22 and 24 are coupled to a lock step logic 26. An event that causes a loss of lock step can occur on either or both of the microprocessor cores 22 and 24. An example of such an event is a data cache error. A loss of lock step, if not promptly corrected, may cause the computer system 18 to "crash" or be "disabled." In addition, because the microprocessor cores 22 and 24 are running the same code sequence, by definition, communications between the microprocessor cores 22 and 24 may not be possible without causing a loss of lock step. For example, the usual means for communication between processors involves load and store sequences, which must be different between two processors, and which consequently will cause a loss of lock step.

SUMMARY

An apparatus, and a corresponding method, for communicating between lock step processors is disclosed. The apparatus is incorporated on two or more processors operating in a lock step mode. Each of the processors comprise processor logic to execute a code sequence, wherein an identical code sequence is executed by the processor logic of each of the two or more processors, a processor-specific resource referenced by the code sequence, the processor-specific resource comprising a unique processor core identification, and a multiplexer coupled to the processor-specific resource, wherein the multiplexer is controlled to read data based on the identification. Coupled to the processors is a lock step logic block operable to read and compare the output of each of the processors. The lock step logic determines if operation of the processors is in a lock step mode or in an independent processor mode. Such determination may be made by the lock step logic turning off, for example.

The corresponding method for communicating between two or more lock step processors comprises receiving a read instruction, determining a processor address associated with the read instruction, determining one or more bits associated with the processor address, comparing the one or more bits to the processor address to determine a location from which the read instruction is executed, and reading data from the determined location.

DESCRIPTION OF THE DRAWINGS

The detailed description will refer to the following figures, in which like numbers refer to like elements, and in which:

FIG. 5 is a flow chart of an operation of the system of FIG. 3.

DETAILED DESCRIPTION

Figure 1:
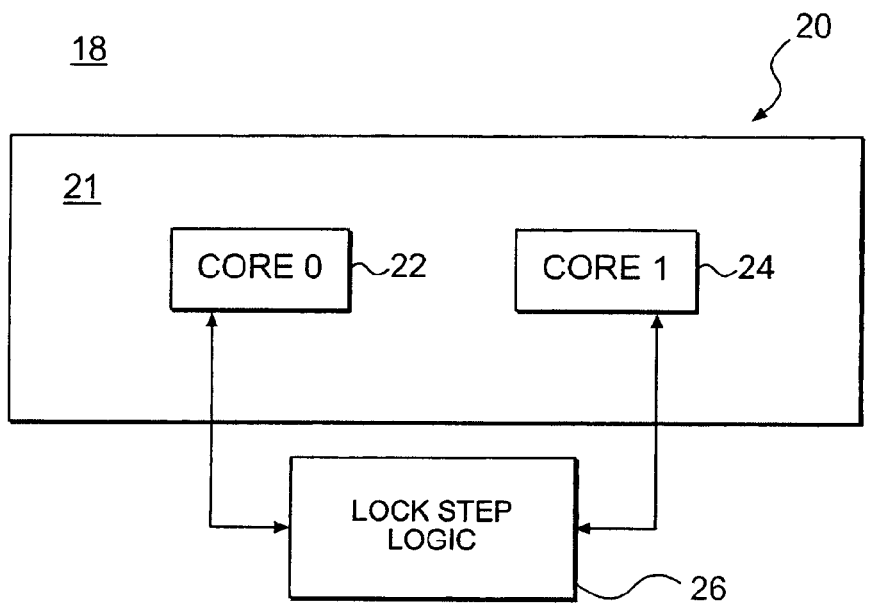
FIG. 1 is a diagram of a prior art computer system employing lock stepped processors.
Figure 2:
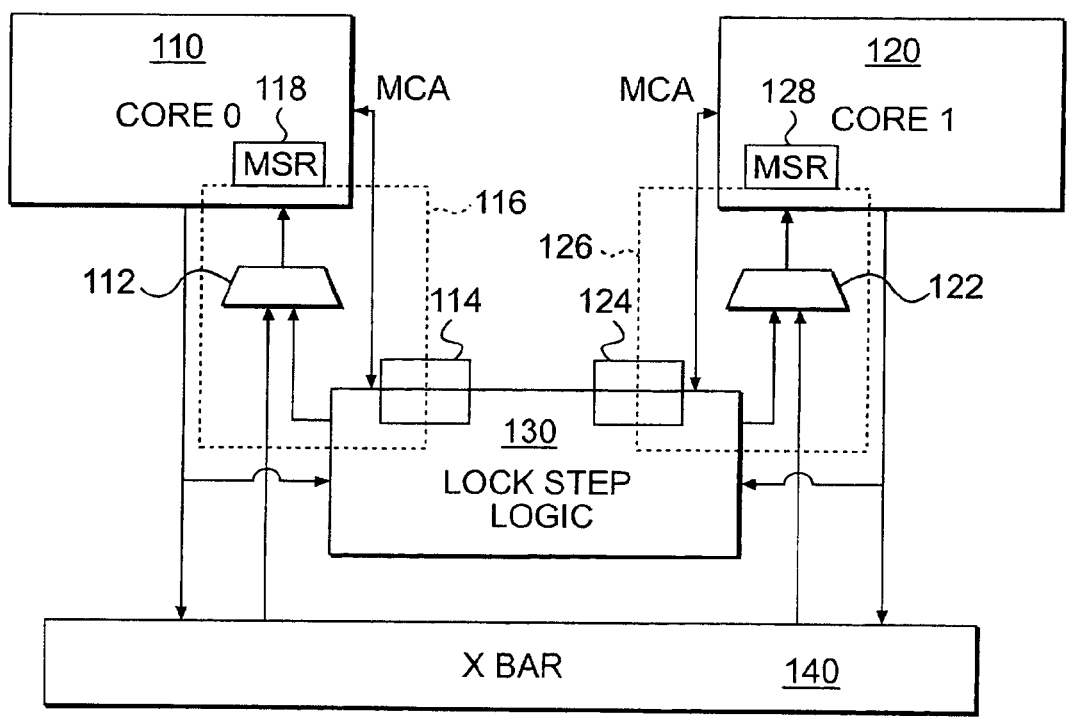
FIG. 2 is a diagram of a multi processor computer system employing lock step processing in which two or more processors are able to directly communicate.

An apparatus, and a corresponding method, for communicating between processors in a multi-processor computer system are disclosed. The apparatus and method may advantageously be applied to a computer system employing lock step processors. Lock step processors, by definition, run identical code streams, and produce identical outputs. FIG. 2 is a diagram of a computer system 100 that includes an apparatus that allows two or more processors to directly communicate without resorting to loads and stores. The computer system employs processor 110 (core 0) and processor 120 (core 1). The processors 110 and 120 may operate in lock step. Coupled to the processors 110 and 120 is a lock step logic block 130 and a cross-bar bus or arbitration unit 140 to control communications with the rest of the system 100. Associated with the processor 110 is a multiplexer 112, a circular bus 116 and a read only machine specific register (MSR) 118. The bus 116 interfaces with the lock step logic block 130 through interface 114. Associated with the processor 120 is a multiplexer 122, a circular bus 126, and a read only MSR 128. The MSRs 118 and 128 and the multiplexers 112 and 122 provide a means for data transfer.

The bus 126 interfaces with the lock step logic block 130 through interface 124. The lock step logic block 130 performs various checks to ensure the processors 110 and 120 operate in lock step, when lock step operation is the desired mode of operation. Also coupled to the processors 110 and 120 is cross bar switch 140, which maps arbitrary input ports to any arbitrary output port.

The arrangement of components shown in FIG. 2 is by way of example only, and is not meant to imply that a specific component must be located as shown. For example, the MSRs 118 and 128 are shown as part of the processors 110 and 120, respectively. However, the MSRs 118 and 128 may be located outside the cores 0 and 1. Furthermore, the processors 110 and 120, the multiplexers 112 and 122, and the lock step logic 130 may all be located on a single silicon chip.

The processors 110 and 120 may, on occasion, need to communicate directly. However, conventional communication means (e.g., using load and store instructions) will cause a loss of lock step operation.

To allow processor-to-processor communication, and not cause loss of lock step, communication means may be added to the system 100 shown in FIG. 2. Such communication means will incorporate the circular bases 116 and 126. Use of the communication means establishes a logical connection between the processors 110 and 120 such that one processor 110 is able to read data for the other processor 120 using a simple code sequence. The use of an embodiment of the communication means is shown in FIG. 3.

Figure 3:
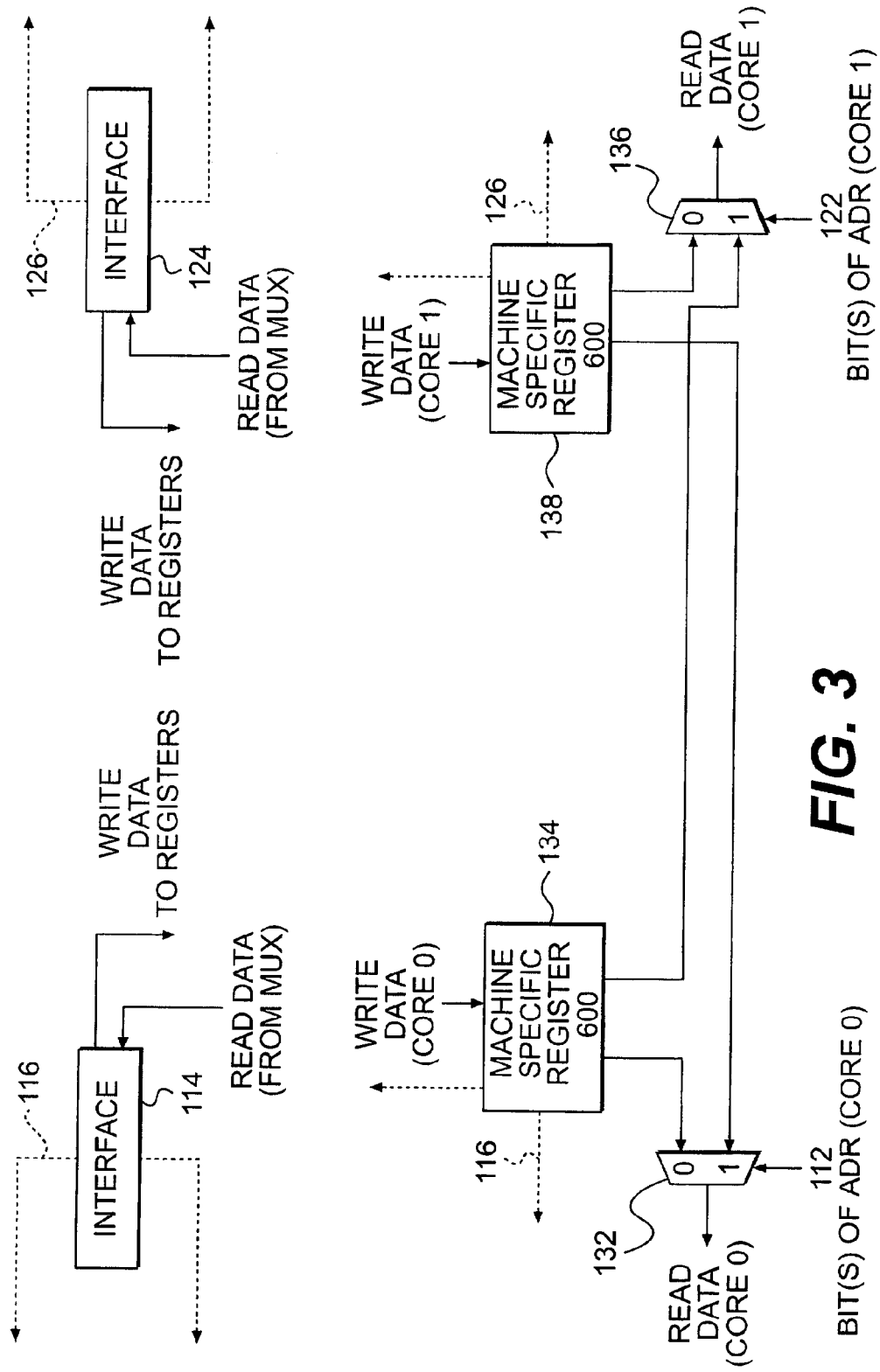
FIG. 3 illustrates the features of FIG. 2 in more detail.

In FIG. 3, the interface 114 for core 0 writes data to an MSR (600) 134 and receives data from multiplexer 132. Similarly, the interface 124 for core 1 writes data to MSR (600) 138 and reads data from the multiplexer 136. In an embodiment, a least significant bit (lsb) of the MSR address is used to determine which processor (110 and 120) the read data comes from. A "0" returns the "own" processor's data, while a "1" returns the other processor's data. This allows communications between the processors 110 and 120 with a code sequence such as:

write data to MSR [0X600]

read data from MSR [0X601].

More specifically, should the multiplexer 132 and the multiplexer 136 receive the "0," then the processor 110 will receive (read) data from the MSR (600) 134, and the processor 120 will read data from the MSR (600) 138. If the multiplexers 132 and 136 receive the "1," then the processor 110 will read data from the MSR 138 and the processor 120 will read data from the MSR 134. Thus, by controlling the multiplexers 132 and 136, communications between the processors 110 and 120 is possible without loss of lock step.

Because only one bit is used, the technique can be used on an arbitrary number of register pairs, and can be extended to more than two processors, by using a greater number of low-order bits in the address of the MSR. Thus, in operation, both the processor 110 and the processor 120 can write values out, and both processors 110 and 120 can read what the other processor wrote.

In the embodiment shown in FIG. 3, all components are located within the lock step logic 130. However, one or more of the components may be located outside the lock step logic 130, while remaining coupled through either the circular bus 116 or the circular bus 126. As an alternative to the configuration shown in FIG. 3, other components may be used as part of the communication means between the processors 110 and 120. For example, in place of the MSRs 134 and 138, the lock step logic 130 may use programmable resources, or may use non-programmable hard-wired resources.

Figure 4:
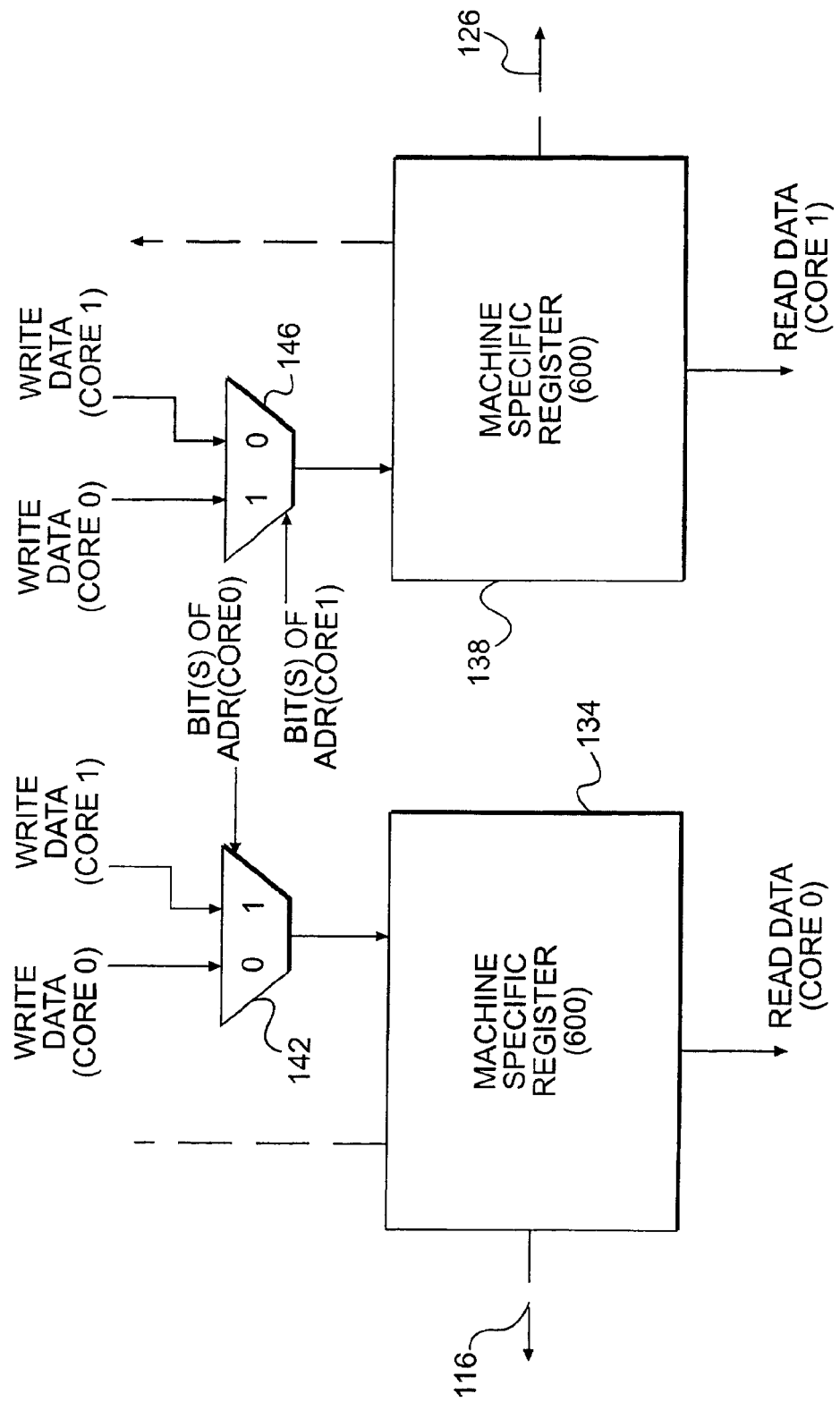
FIG. 4 illustrates alternative means for inter-processor communication.

FIG. 3 shows a configuration to allow read communications between lock stepped processors. FIG. 4 shows a configuration to allow write communications between lock stepped processors without causing a loss of lock step. The configuration shown in FIG. 4 is identical to that of FIG. 3, except that multiplexers 142 and 146 on the write side replace the functions of the multiplexers 132 and 136 of FIG. 3 on the read side.

FIG. 5 is a flowchart illustrating an inter-processor communication operation 200 of the communication means of FIG. 3. In FIG. 5, the operation 200 begins in block 205. In block 210, a read operation is specified, with an address of the processor specified as a part of read operation. The specific processor may be identified by comparing one or more bits of the address to the addresses of the processors 110 and 120, block 215. For example, the least significant bit (lsb) may be used. Assuming the lsb of the address is "0," the processor 110 reads the data from MSR(600) 134, and the processor 120 reads the data from the MSR(600) 138, block 220. In block 225, the operation 200 ends.

The terms and descriptions used herein are set forth by way of illustration only and are not meant as limitations. Those skilled in the art will recognize that many variations are possible within the spirit and scope of the invention as defined in the following claims, and there equivalents, in which all terms are to be understood in their broadest possible sense unless otherwise indicated.

The invention claimed is:

1. An apparatus that provides direct read and write communications between lock step processors, wherein two or more processors operate in a lock step mode, wherein each of the two or more processors comprises a processor logic to execute a code sequence, and wherein an identical code sequence is executed by the processor logic of each of the two or more processors, the apparatus, comprising:

a lock step logic block operable to allow each of the two or more processors to read data from and write data to each of the other two or more processors, the lock step logic block, comprising:
 a processor-specific resource referenced by the code sequence, and
 a multiplexer coupled to a write side of each of the two or more processors, wherein the multiplexer is controlled to write data based on an identification of the processor-specific resource, the identification of the processor-specific resource determining which processor provides the data, wherein the two or more processors operating in the lock step mode can perform inter-processor read and write operations without resorting to load and store instructions that cause a loss of lock step.

2. The apparatus of claim 1, wherein the processor-specific resources is a machine specific register (MSR).

3. The apparatus of claim 1, wherein the processor-specific resource is a programmable register.

4. The apparatus of claim 1, wherein the processor-specific resource is hard-wired to a processor-unique value.

5. An apparatus that provides direct read and write communications between lock step processors, wherein two or more processors operate in a lock step mode, wherein each of the two or more processors comprises a processor logic to execute a code sequence, and wherein an identical code sequence is executed by the processor logic of each of the two or more processors, the apparatus, comprising:

first communications means for establishing a first logical connection among each of the two or more processors such that each processor is capable of reading data for any of the other two or more processors;

second communications means for establishing a second logical connection among each of the two or more processors such that each processor is capable of providing the data; and lock step logic means for determining an identity of each of the two or more processors, comprising:
 a processor-specific resource referenced by the code sequence, and
 a multiplexer coupled to a write side of each of the two or more processors, wherein the multiplexer is controlled to write data based on an identification of the processor-specific resource, the identification of the processor-specific resource determining which processor provides the data, wherein the two or more processors operating in the lock step mode can perform inter-processor read and write operations without resorting to load and store instructions that cause a loss of lock step.

6. The apparatus of claim 5, wherein the processor-specific resources is a machine specific register (MSR).

7. The apparatus of claim 5, wherein the processor-specific resource is a programmable register.

8. The apparatus of claim 5, wherein the processor-specific resource is hard-wired to a processor-unique value.

9. The apparatus of claim 5, wherein the lock step logic means reads one or more bits associated with an address of a processor.

10. The apparatus of claim 9, wherein the one or more bits comprise a least significant bit.

11. A method for preventing loss of lock step among lock-stepped processors, comprising:
receiving a write instruction;
determining a processor address associated with the write instruction;
determining one or more bits associated with the processor address, the one or more bits specifying which processor supplies the write data;
comparing the determined one or more bits to the processor address to determine a location from which the write instruction is executed, wherein the determined location is a processor-specific resource; and
allowing each of the lock-stepped processors to write the data without resorting to load and store operations.

12. The method of claim 11, wherein the processor-specific resource is a machine specific register (MSR).

13. The method of claim 12, further comprising executing a code sequence to cause the processor address to be read from the MSR.

14. The method of claim 11, wherein the processor-specific resource is a programmable register.

15. The method of claim 11, wherein the processor-specific resource is hard-wired to a processor-specific resource.

16. The method of claim 11, wherein the one or more bits comprise a least significant bit.

17. An apparatus that prevents loss of lock step among lock step processors during inter-processor communications, comprising:
a first circular bus coupled to a first processor;
a second circular bus coupled to a second processor, wherein the first and the second processor operate in lock step with each other; and
lock step logic means coupled to the first and second circular busses, the lock step logic means, comprising:
a processor-specific resource referenced by the code sequence, and
a multiplexer coupled to a write side of each of the two or more processors, wherein the multiplexer is controlled to write data based on an identification of the processor-specific resource, the identification of the processor-specific resource determining which processor provides the data, wherein one processor can read/write data intended for the other processor without resorting to load and store instructions that cause a loss of lock step, and
means for identifying which of the first and the second processor read/write data.

\* \* \* \* \*